(12) United States Patent
Suciu et al.

(10) Patent No.: US 9,003,759 B2
(45) Date of Patent: Apr. 14, 2015

(54) PARTICLE SEPARATOR FOR TIP TURBINE ENGINE

(75) Inventors: Gabriel Suciu, Glastonbury, CT (US); Gary D. Roberge, Tolland, CT (US); Brian Merry, Andover, CT (US)

(73) Assignee: United Technologies Corporation, Hartford, CT (US)

(*) Notice: Subject to any disclaimer, the term of this patent is extended or adjusted under 35 U.S.C. 154(b) by 2426 days.

(21) Appl. No.: 11/719,799

(22) PCT Filed: Dec. 1, 2004

(86) PCT No.: PCT/US2004/040072
§ 371 (c)(1),
(2), (4) Date: May 21, 2007

(87) PCT Pub. No.: WO2006/059987
PCT Pub. Date: Jun. 8, 2006

(65) Prior Publication Data
US 2009/0145101 A1   Jun. 11, 2009

(51) Int. Cl.
| | |
|---|---|
| F02G 3/00 | (2006.01) |
| F02C 7/052 | (2006.01) |
| F01D 5/02 | (2006.01) |
| F02C 3/073 | (2006.01) |
| F02C 7/05 | (2006.01) |
| F02K 3/068 | (2006.01) |

(52) U.S. Cl.
CPC ............. *F02C 7/052* (2013.01); *F01D 5/022* (2013.01); *F02C 3/073* (2013.01); *F02C 7/05* (2013.01); *F02K 3/068* (2013.01); *F05D 2250/71* (2013.01)

(58) Field of Classification Search
USPC .............. 60/226.1, 39.092, 39.093; 415/79; 416/245 R
See application file for complete search history.

(56) References Cited

U.S. PATENT DOCUMENTS

| | | | |
|---|---|---|---|
| 1,544,318 | A | 6/1925 | Hodgkinson |
| 2,221,685 | A | 11/1940 | Smith |
| 2,414,410 | A | 1/1947 | Griffith |
| 2,499,831 | A | 3/1950 | Palmatier |
| 2,548,975 | A | 4/1951 | Hawthorne |
| 2,611,241 | A | 9/1952 | Schulz |

(Continued)

FOREIGN PATENT DOCUMENTS

| | | |
|---|---|---|
| GB | 716263 | 9/1954 |
| GB | 785721 | 11/1957 |

(Continued)

*Primary Examiner* — Devon Kramer
*Assistant Examiner* — Vikansha Dwivedi
(74) *Attorney, Agent, or Firm* — Carlson, Gaskey & Olds, P.C.

(57) ABSTRACT

A particle separator (20) for a tip turbine engine (10) includes a generally conical inclined leading surface (24) leading to a maximum radius (25) and a tapered trailing surface (56) having a radius at all points therealong less than the maximum radius (25). The trailing surface (56) of the particle separator (20) is tapered and/or curved radially inwardly away from the maximum radius (25). Air flowing toward the core airflow inlet is first diverted radially outwardly by the inclined leading surface (24) of the particle separator (20) to the maximum radius (25) of the particle separator (20). The air then follows the trailing surface (56) radially inwardly to flow axially into the core airflow inlet. While the air can follow the contours of the particle separator (20) around the maximum radius (25) and into the core airflow inlet, any particles, such as dirt, will have more inertia and will pass radially outwardly of the core airflow inlet through the bypass fan.

12 Claims, 2 Drawing Sheets

(56) References Cited

U.S. PATENT DOCUMENTS

| | | |
|---|---|---|
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A * | 3/1973 | Davies et al. ............... 60/226.1 |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,493,185 A * | 1/1985 | Hobbs ..................... 60/39.092 |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 7,845,157 B2 * | 12/2010 | Suciu et al. ................... 60/226.1 |
| 2002/0190139 A1 | 12/2002 | Morrison |
| 2003/0031556 A1 | 2/2003 | Mulcaire et al. |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |

FOREIGN PATENT DOCUMENTS

| | | |
|---|---|---|
| GB | 1287223 | 8/1972 |
| GB | 2016597 | 9/1979 |
| GB | 2026102 | 1/1980 |
| GB | 2401655 | 11/2004 |
| JP | 10184305 | 7/1998 |
| WO | 9902864 | 1/1999 |
| WO | 02081883 | 10/2002 |
| WO | 2004092567 | 10/2004 |
| WO | 2006059986 | 6/2006 |
| WO | 2006059987 | 6/2006 |
| WO | 2006059993 | 6/2006 |
| WO | 2006110125 | 10/2006 |
| WO | 2006112807 | 12/2006 |

* cited by examiner

PARTICLE SEPARATOR FOR TIP TURBINE ENGINE

BACKGROUND OF THE INVENTION

The present invention relates to a tip turbine engine, and more particularly to a particle separator for deflecting particles away from a core airflow inlet of a tip turbine engine.

An aircraft gas turbine engine of the conventional turbofan type generally includes a forward bypass fan, a low pressure compressor, a high pressure compressor, a combustor, a high pressure turbine, and a low pressure turbine, all located along a common longitudinal axis. The low and high pressure compressors are rotatably driven to compress entering air to a relatively high pressure. This high pressure air is then mixed with fuel in the combustor, where it is ignited to form a high energy gas stream. This gas stream flows axially aft to rotatably drive the high pressure turbine, which rotatably drives the high pressure compressor via a high pressure shaft. The gas stream leaving the high pressure turbine is expanded through the low pressure turbine, which rotatably drives the forward bypass fan and low pressure compressor via a low pressure shaft.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as centrifugal compressors. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

In conventional gas turbine engines, particles entering the engine pass through the bypass fan before entering the core airflow inlet, which may be the inlet to the low pressure compressor. Particles entering the engine will be thrown radially outwardly by the rotation of the bypass fan blades and will therefore pass radially outwardly of the core airflow inlet. Thus, the dirt or other particles will not erode the compressor blades and vanes, turbine blades and vanes, and rub strips and any cooling passages and air passages will not become clogged.

However, in the current tip turbine engines, the core airflow inlet is forward of the bypass fan. Air flows directly into the core airflow inlet without first passing through the bypass fan. There is not currently any protection to keep particles from entering the core airflow inlet.

SUMMARY OF THE INVENTION

The present invention provides a particle separator for a tip turbine engine. The particle separator includes a generally conical inclined leading surface leading to a maximum radius. A trailing surface aft of the maximum radius has a radius at all points therealong less than the maximum radius. The trailing surface of the particle separator is tapered and/or curved radially inwardly away from the maximum radius to lead into the core airflow inlet. The particle separator also includes a mount at an axially rearward end of the trailing surface, the mount being attachable to a tip turbine engine.

In use, the particle separator is mounted in front of a core airflow inlet of a tip turbine engine of the type described above. The core airflow inlet has a radius less than or equal to the maximum radius of the particle separator. Air flowing toward the core airflow inlet is first diverted radially outwardly by the inclined leading surface of the particle separator, and then follows the trailing surface radially inwardly to flow axially into the core airflow inlet. While the air can follow the contours of the particle separator around the maximum radius and into the core airflow inlet, any particles, such as dirt, will have more inertia and will pass radially outwardly of the core airflow inlet through the bypass fan.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
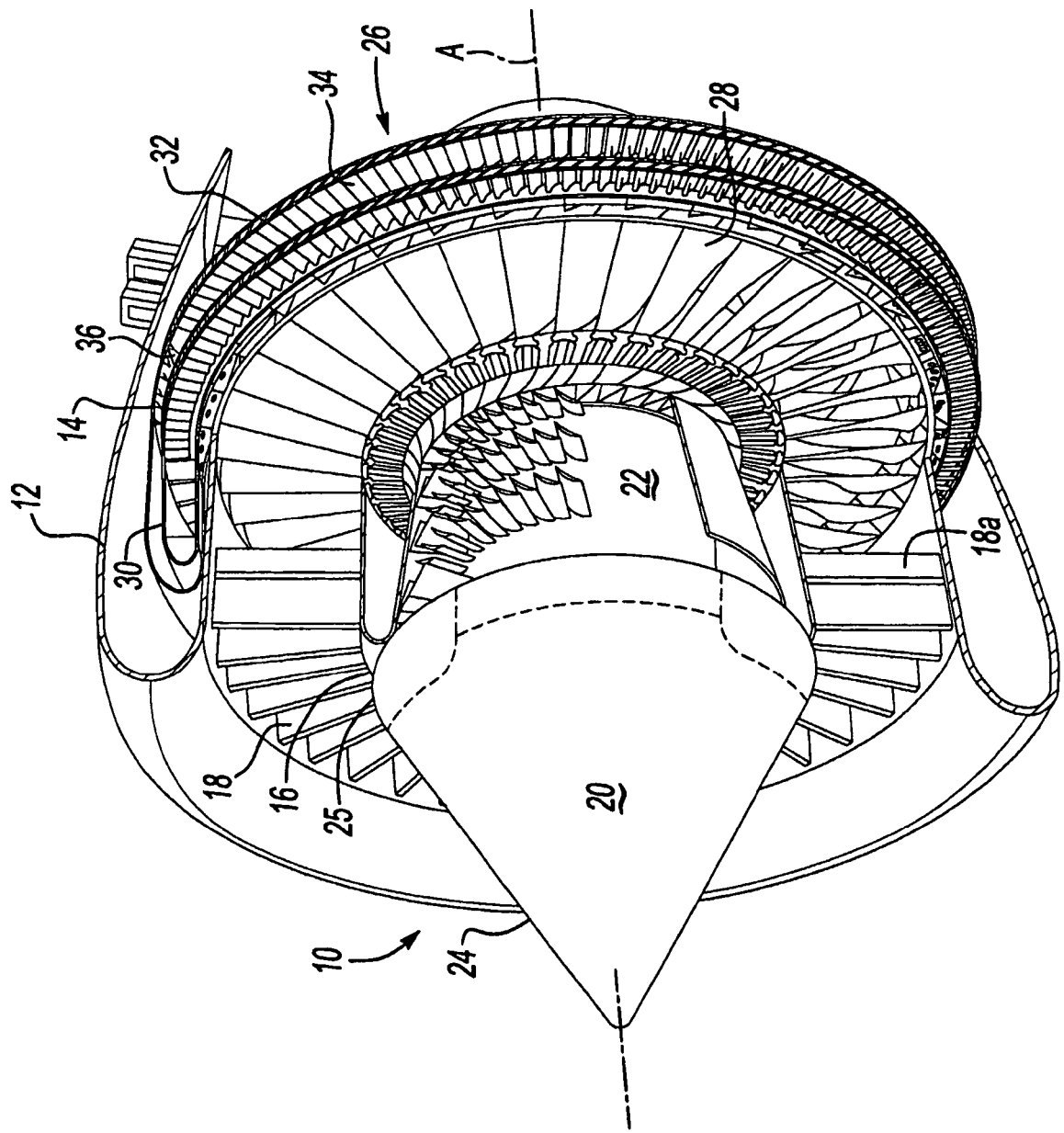
FIG. 1 is a partial sectional perspective view of a tip turbine engine according to the present invention.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18a.

A particle separator 20 is preferably located along the engine centerline A to direct particles outwardly of an axial compressor 22, which is mounted about the engine centerline A behind the particle separator 20. The particle separator 20 includes a leading inclined surface 24 leading to a maximum radius 25. The leading inclined surface 24 could be radially-symmetric, such as the generally conical leading inclined surface 24 that is shown.

A fan-turbine rotor assembly 26 is mounted for rotation about the engine centerline A aft of the axial compressor 22. The fan-turbine rotor assembly 26 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative a plurality of tip turbine stators 36 which extend radially inwardly from the rotationally fixed static outer support structure 14. The annular combustor 30 is disposed axially forward of the turbine 32 and is in fluid communication with the turbine 32.

Figure 2:
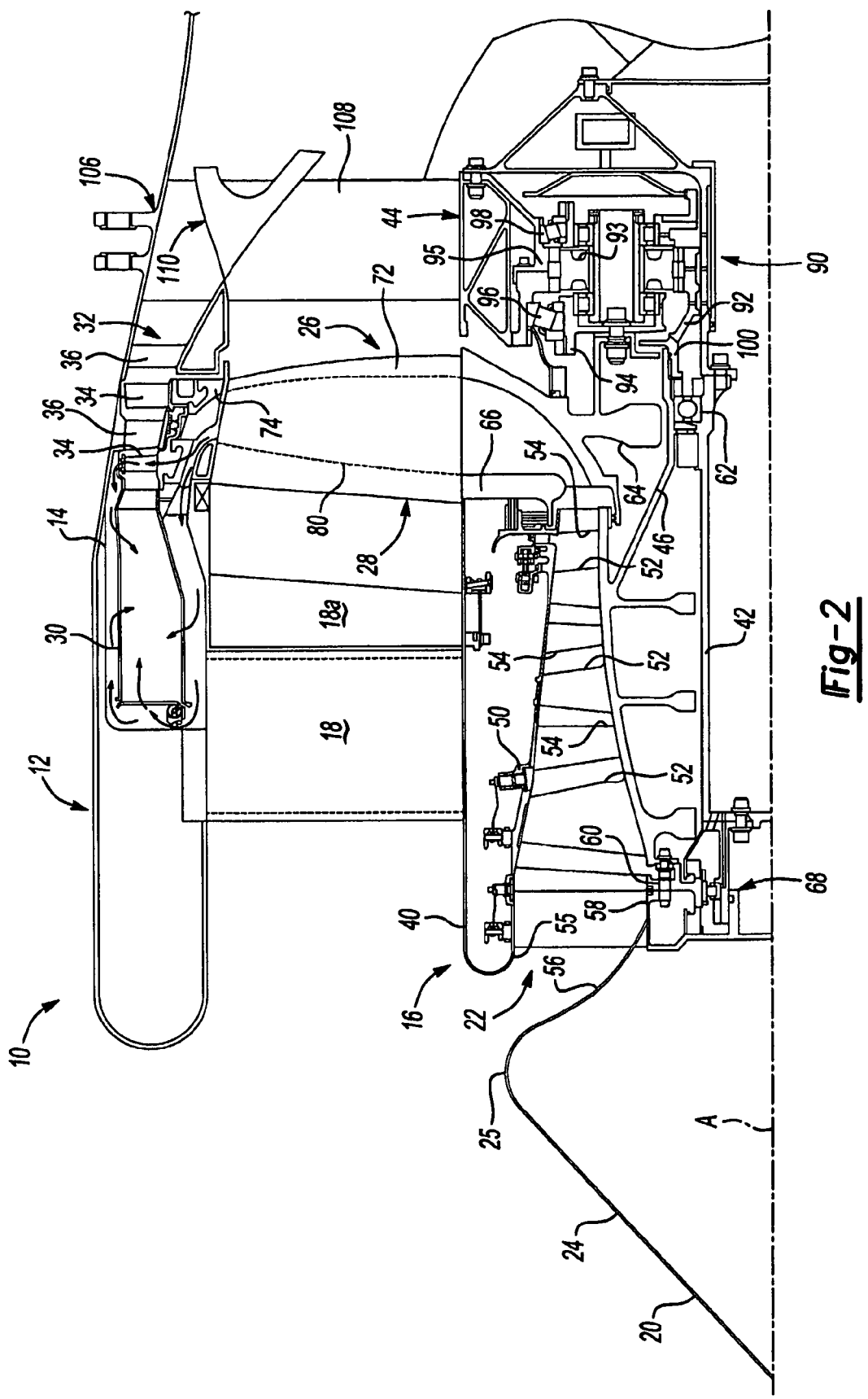
FIG. 2 is a longitudinal sectional view of the tip turbine engine of FIG. 1 taken along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The splitter 40 forms a core airflow inlet 55 aft of the particle separator 20. The core airflow inlet 55 may have a radius substantially equal to the maximum radius 25 of the particle separator 20, such that the core airflow inlet 55 may have a radius equal to, slightly less than, or even slightly larger than, the maximum radius 25. The term "substantially equal to" in this context means that the maximum radius 25 should be sized to ensure that the inertia of a large majority of the expected particles would carry the particles radially outwardly of the core airflow inlet 55 in the particular configuration and application, which would depend upon the anticipated velocity and mass of the particles. The trailing surface 56 of the particle separator 20 is tapered and curved slightly away from the maximum radius 25 to lead into the core airflow inlet 55. The trailing surface 56 has a radius at all points therealong less than the maximum radius 25. The particle separator 20 also includes a mount 58 at an axially rearward end of the trailing surface 56, the mount 58 being attachable to the tip turbine engine 10, such as via a plurality of fasteners 60 (one shown).

The fan-turbine rotor assembly 26 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 in a direction generally parallel to the engine centerline A and turns the airflow from an axial airflow direction toward a radial airflow direction. The airflow is radially communicated through a core airflow passage 80 within the fan blade section 72, which acts as a centrifugal compressor chamber where the airflow is centrifugally compressed. The diffuser section 74 receives the airflow from the core airflow passage 80, and then diffuses the airflow and turns it once again toward an axial airflow direction toward the annular combustor 30. Preferably, the airflow is diffused axially forward in the engine 10, however, the airflow may alternatively be communicated in another direction.

A gearbox assembly 90 aft of the fan-turbine rotor assembly 26 provides a speed increase between the fan-turbine rotor assembly 26 and the axial compressor 22, which in the embodiment shown is at a 3.34 ratio. In the embodiment shown, the gearbox assembly 90 is an epicyclic gearbox, such as a planetary gearbox, that provides co-rotating engagement between the fan-turbine rotor assembly 26 and an axial compressor rotor 46. Alternatively, a counter-rotating planetary gearbox could be provided. The gearbox assembly 90 includes a sun gear 92, which rotates with the axial compressor 22, and a planet carrier 94, which rotates with the fan-turbine rotor assembly 26 to provide a speed differential therebetween. A plurality of planet gears 93 (one shown) are mounted to the planet carrier 94. The planet gears 93 engage the sun gear 92 and a ring gear 95. The gearbox assembly 90 is mounted for rotation between the sun gear 92 and the static outer support housing 44 through a gearbox forward bearing 96 and a gearbox rear bearing 98. The sun gear 92 is rotationally engaged with the axial compressor rotor 46 at a splined interconnection 100 or the like. Alternatively, the gearbox 90 could provide a speed decrease between the fan-turbine rotor assembly 26 and the axial compressor rotor 46.

In operation, air flowing toward the core airflow inlet 55 is first diverted radially outwardly by the leading inclined surface 24 of the particle separator 20 to the maximum radius 25 of the particle separator 20. The air then follows the trailing surface 56 radially inwardly to flow axially into the core airflow inlet 55. While the air can follow the contours of the particle separator 20 around the maximum radius 25 along the tapered trailing surface 56 and into the core airflow inlet 55, any particles, such as dirt, will have more inertia and will pass radially outwardly of the core airflow inlet 55 through the bypass and the fan blades 28.

Air entering the core airflow inlet 55 of the axial compressor 22 is compressed by the three stages of the compressor blades 52 and compressor vanes 54. The compressed air from the axial compressor 22 enters the inducer section 66 in a direction generally parallel to the engine centerline A, and is then turned by the inducer section 66 radially outwardly through the core airflow passage 80 of the hollow fan blades 28. The axial compressor 22 and inducer section 66 define a core airflow path that leads to the core airflow passage 80 of the hollow fan blades 28. The airflow is further compressed centrifugally in the hollow fan blades 28 by rotation of the hollow fan blades 28. The diffuser section 74 receives air from the core airflow passage 80, and turns and diffuses the airflow axially forward in the engine 10 into the annular combustor 30. The compressed core airflow from the hollow fan blades 28 is mixed with fuel in the annular combustor 30 and ignited to form a high-energy gas stream. The high-energy gas stream expands over the plurality of tip turbine blades 34 mounted about the outer periphery of the fan-turbine rotor assembly 26 to drive the fan-turbine rotor assembly 26, which in turn drives the axial compressor 22 via the gearbox assembly 90. Concurrent therewith, the fan-turbine rotor assembly 26 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, different shapes and different arrangements of the particle separator 20 within the scope of the present invention could be used with engines of varying types and sizes.

The invention claimed is:

1. A turbine engine comprising:
    a fan rotatable about an axis, the fan including a plurality of radially-extending fan blades;
    a core airflow path having an inlet to an axial compressor;
    a particle separator disposed at least partially in front of the inlet, wherein the particle separator includes an inclined leading surface leading to a maximum radius, the maximum radius of the particle separator is substantially equal to a radius of the inlet;
    at least one of the radially-extending fan blades defining a compressor chamber extending radially therein, the compressor chamber leading to at least one combustor, the core airflow path leading to the at least one combustor; and at least one turbine operatively mounted proximate outer ends of the fan blades downstream of the at least one combustor, wherein a secondary air flow path radially outward of the maximum radius passes through the engine, the core airflow path and secondary airflow path receiving all flow aft of the maximum radius.

2. The turbine engine of claim 1 wherein at least a portion of the inlet is radially inward of the fan blades.

3. The turbine engine of claim 2 wherein the particle separator, the core airflow path and the fan are disposed along an axis of the turbine engine.

4. The turbine engine of claim 1 wherein the particle separator further includes a trailing surface having a radius at all points therealong less than the maximum radius.

5. The turbine engine of claim 4 wherein the trailing surface is tapered from the maximum radius to lead into the inlet.

6. The turbine engine of claim 4 wherein the trailing surface is curved away from the maximum radius to lead into the inlet.

7. The turbine engine of claim 4 wherein the leading surface includes a generally conical surface.

8. The turbine engine of claim 4, wherein the trailing surface is at least partially within an outer nacelle of the turbine engine.

9. The turbine engine of claim 8, wherein the trailing surface is at least partially within a static inner support structure of the turbine engine.

10. The turbine engine of claim 1 wherein the inlet is upstream of the fan.

11. The particle separator of claim 1, wherein a splitter and the trailing surface form the inlet.

12. The turbine engine of claim 1, further comprising a mount at an axially rearward end of the trailing surface, the mount being attachable to the turbine engine at a position radially inward of the axial compressor.

* * * * *